Feb. 17, 1925.

J. A. BOWDEN 1,527,023

BELL CORD THIMBLE

Filed April 10, 1924

John A. Bowden, Inventor

By Walter B. Burrow.

Attorney

Patented Feb. 17, 1925.

1,527,023

UNITED STATES PATENT OFFICE.

JOHN A. BOWDEN, OF PORTSMOUTH, VIRGINIA.

BELL-CORD THIMBLE.

Application filed April 10, 1924. Serial No. 705,622.

*To all whom it may concern:*

Be it known that I, JOHN A. BOWDEN, a citizen of the United States, residing at Portsmouth, in the county of Norfolk and State of Virginia, have invented certain new and useful Improvements in Bell-Cord Thimbles, of which the following is a specification.

My invention relates to bell cord thimbles.

The object of the invention is to provide an efficient thimble for the passage of the cord of locomotive bells and is located in an orifice in the front part of the cab of the engine.

Further objects and advantages will be more fully described herein and specifically pointed out in the claim hereunto annexed recourse being had to the accompanying drawing forming a part of this specification in which:

In the drawing like reference numerals indicate similar parts in all the several views.

Figure 1:
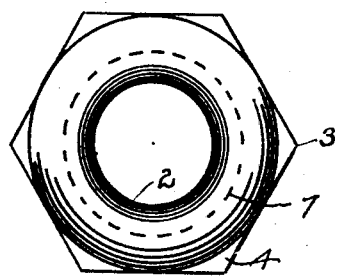
Figure 1 is an elevation of the thimble viewed towards the clamping nut or washer.

1 is the thimble or grommet casting having a chamfered or rounded interior 2 and a hexagonal nut or flange portion indicated at 3 and 4.

The thimble is provided with a male thread 5 and points 6, the latter is for the purpose of forming points to hold the thimble when the nut 7 is screwed up against the plate 9 of the locomotive cab. The nut is provided with a female thread 8 to pass over the portion 5 of the thimble and completes the rounded or chamfered shape of the exterior of the thimble.

Figure 5:
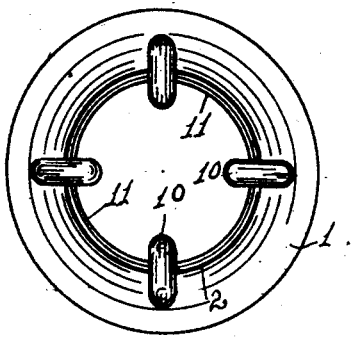
Figure 5 is a roller equipped modification.
Figure 2:
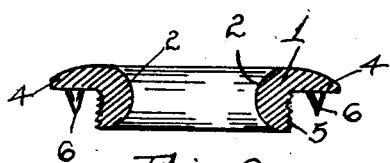
Figure 2 is a cross section of the thimble.
Figure 3:
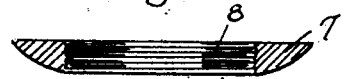
Figure 3 is a cross section of the clamping nut or washer.

In Figure 5 I show small anti-friction rollers 10 supported on the ring 11 fastened to one side of the thimble.

Figure 6:
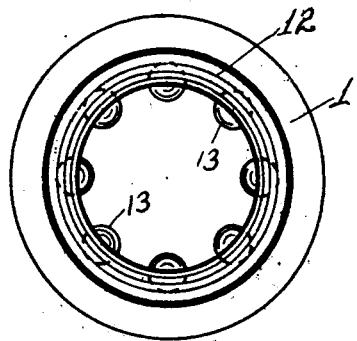
Figure 6 is a ball anti-friction modification of the same.
Figure 7:
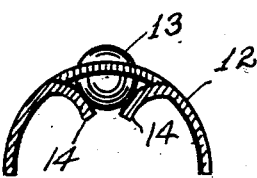
Figure 7 is a cross section of the ball retaining ring.

In Figure 6, I show another modification in which 12 is a retaining ring provided with anti-friction balls 13 seated within the bent down flanges 14, as in Figure 7.

Figure 4:
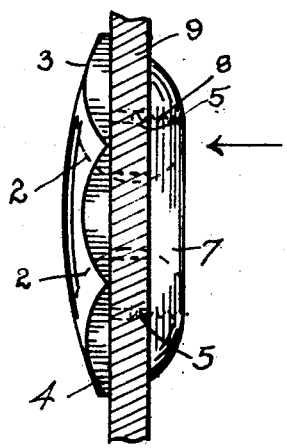
Figure 4 is a cross section of a portion of the cab front plate showing my invention in position.

The modifications may be used, if required, but the invention as shown in Figure 4 will be found satisfactory and offers little resistance to the bell cord besides being cheap, easily applied and adapted for any thickness of material to which the thimble is to be affixed.

I claim:

A bell cord thimble, of an outer and inner chamfered annulus or ring, clamping nut means therefor conforming to the interior and exterior of the thimble, and anti-friction means surrounding the central opening of the annulus.

In testimony whereof I have hereunto affixed my signature.

JOHN A. BOWDEN.